United States Patent Office 3,112,325
Patented Nov. 26, 1963

3,112,325
PROCESS FOR MANUFACTURE OF EPOXIDIZED FATTY ACIDS, ALCOHOLS AND ESTERS THEREOF
Hisato Murata and Fujihiko Higo, Ogumachi, Arakawa-ku, Tokyo, Japan, assignors to Asahi Electrochemical Industrial Company, Ltd., Tokyo, Japan
No Drawing. Filed Jan. 25, 1954, Ser. No. 406,043
8 Claims. (Cl. 260—348.5)

This invention relates to a process for manufacture of epoxy products, starting from unsaturated fatty acids, unsaturated alcohols and their derivatives, such as their esters.

It has heretofore been known that the material for epoxidation, such as fatty acid, is epoxidized with peroxidic acid, and also that the peracetic acid is prepared by reacting acetic anhydride with hydrogen peroxide in the presence of sulphuric acid, as a catalyst. However, the peracetic acid thus prepared, that is, prepared in the presence of sulphuric acid, as a catalyst, has been employed for the epoxidation after the sulphuric acid had been neutralized, due to the belief that the presence of the sulphuric acid induces the dihydroxylation of the epoxy group formed.

Now, it has been discovered according to the present invention that if the mixture of the material for epoxidation, formic or acetic acid, hydrogen peroxide and a controlled small amount of sulphuric acid, as a catalyst, is subjected to a reaction for epoxidation, a highest yield of an epoxy product can be obtained in a shortest time, and without the fear of the epoxy group formed being dihydroxylated.

The amount of the sulphuric acid to be employed should be so small that the epoxidation may proceed most favourably but without the epoxy group formed being dihydroxylated.

The entirely novel point of the invention is that as distinct from the known processes for epoxidation, the material for expoxidation is epoxidized in the state of a mixture thereof with formic or acetic acid, hydrogen peroxide and sulphuric acid, as a catalyst.

The mechanism of epoxidation in the process of the invention resides in that the formic or acetic acid is first oxidized by hydrogen peroxide in the presence of sulphuric acid, as a catalyst, so as to give rise to peroxidic acid, which is then brought into reaction with the material for epoxidation.

The formation of the peroxidic acid according to the invention is governed by an equilibrium which is established between the peroxidic acid and the hydrogen peroxide. The equilibrium is however broken according as the peroxidic acid is progressively consumed for epoxidation, thereby converting to the original acid, which then reacts with the hydrogen peroxide to form more peroxidic acid, which further epoxidizes the double bond of which the material for epoxidation possesses.

The advantages obtained by the invention is that the epoxidation is carried out in a shortest time, and that a smallest amount of hydrogen peroxide may be sufficient for effecting a most satisfactory epoxidation reaction.

After the epoxidataion reaction has been completed the reaction product is left, when two layers are formed, one being the epoxy product, and the other a waste liquor. The two layers are separated from each other in a known way. The waste liquor thus recovered by separation was found still containing a further amount of hydrogen peroxide sufficient enough to be reused for further epoxidation. This fact demonstrates that a smallest amount of hydrogen peroxide may be sufficient for effecting a most favourable epoxidation reaction according to the invention. In the known processes, however, a considerably greater amount of hydrogen peroxide, as compared with the invention, must have been consumed in the operation of obtaining previously the peroxidic acid to be used for epoxidation.

The epoxy product obtained by the invention are suitable as plasticizers for synthetic resins such as polyvinyl chloride and its polymers. The term "I.V." as used in the specification denotes the well known characteristic of Iodine Value as measured by the Wijs method (American Oil Chemists' Society Official Method Cd 1–25).

Example 1

400 grs. of amellia oil (I.V. 79.50), 170 grs. of 30% hydrogen peroxide, 34 grs. formic acid and 0.8 gr. sulphuric acid were mixed, and the mixture was subjected to a reaction for epoxidation at 50° C., for 9 hours, under stirring, thereby giving an epoxy product having I.V. of 12.3 and an epoxidation index of 77.2% against the theoretical based on the double bond of which the material for epoxidation possesses.

To the epoxy product thus formed there were added further quantities of hydrogen peroxide, formic acid and sulphuric acid, each corresponding to that given above respectively, and the mixture was again reacted for epoxidation at 50° C., for 2 hours, thereby giving an epoxy product having I.V. of 1.30, and an epoxidation coefficient of 89.2% against the theoretical based on the double bond of which the material for epoxidation possesses.

Example 2

400 grs. soya bean oil (I.V. 134.25), 280 grs. of 30% hydrogen peroxide, 56 grs. formic acid, and 1.4 grs. sulphuric acid were mixed and reacted for epoxidation at 50° C., for 7.5 hours, thereby giving an epoxy product having I.V. of 13.4 and an epoxidation coefficient of 72.2%, which can be esterified under the presence of sodium hydroxide as a catalyst to form an epoxidized ester.

Example 3

Methyl ester of soya bean oil fatty acid was epoxidized in an entirely same manner as described in Example 2, giving thereby an epoxy product having I.V. of 44.3 and an epoxidation coefficient of 40.8%.

Example 4

400 grs. of polymerized soya bean oil (I.V. 124.2), 280 grs. of 30% hydrogen peroxide, 56 grs. formic acid and 1.4 grs. sulphuric acid were mixed, and the mixture was reacted for expoxidation at 50° C., for 7.5 hours, giving thereby an epoxy product having I.V. of 6.4 and an epoxidation coefficient of 73.6%.

Example 5

400 grs. of sperm oil (I.V. 69.10), 267 grs. of 30% hydrogen peroxide, 53 grs. formic acid and 1.3 grs. sulphuric acid were mixed, and the mixture was subjected to a reaction for epoxidation at 50° C., for 8 hours, giving thereby an epoxy product having I.V. of 6.4 and an epoxidation coefficient of 82.1%.

Example 6

15 kgs. of soya bean oil (I.V. 131.0), 11 kgs. of 30% hydrogen peroxide, 0.79 kg. of 80% formic acid and 0.044 kg. sulphuric acid were mixed, and the mixture was reacted for epoxidataion at 65–70° C., for 7.5 hours, under stirring, thereby giving an epoxy product having I.V. of 17.4 and an epoxidation coefficient of 72.3%. The epoxy product was separated as a product, from the waste liquor of 9.8 kgs., which contained 7.7% of hydrogen peroxide, and of which the available oxygen was 2.23 mols per kg. of the waste liquor.

The waste liquor was mixed with 0.78 kg. of 80% formic acid, 0.044 kg. sulphuric acid and 15 kgs. of soya bean oil (I.V. 131.0), and the mixture was reacted for epoxidation at the same temperature for 5 hours, thereby giving an epoxy product having I.V. of 102.8 and an epoxidation coefficient of 20.4%. After this second epoxidation, the available oxygen contained in the waste liquor was reduced to 0.175 mol per kg. of the waste liquor, showing that the hydrogen peroxide originally employed could have been utilized in the ratio of 85.0%.

We claim:

1. In the process of epoxidizing esters of ethylenically unsaturated higher fatty acids, the alcohol moiety of each said esters being saturated, by means of formic acid and hydrogen peroxide at moderate temperatures the improvement which consists in performing the reaction in the presence of a catalytic amount of sulfuric acid.

2. In the process of epoxidizing esters of ethylenically unsaturated higher fatty alcohols, the acid moiety of each said esters being saturated, by means of formic acid and hydrogen peroxide at moderate temperatures, the improvement which consists in performing the reaction in the presence of a catalytic amount of sulfuric acid.

3. In the process of epoxidizing unsaturated fatty acid esters of unsaturated alcohols, by means of formic acid and hydrogen peroxide at moderate temperatures, the improvement which consists in performing the reaction in the presence of a catalytic amount of sulfuric acid.

4. In the process of epoxidizing an ethylenically unsaturated higher fatty alcohol, by means of formic acid and hydrogen peroxide at moderate temperatures, the improvement which consists in performing the reaction in the presence of a catalytic amount of sulfuric acid.

5. In the process of epoxidizing an ethylenically unsaturated higher fatty acid, by means of formic acid and hydrogen peroxide at moderate temperatures, the improvement which consists in performing the reaction in the presence of a catalytic amount of sulfuric acid.

6. In the process of epoxidizing an ethylenically unsaturated higher fatty acid glyceride, by means of formic acid and hydrogen peroxide at moderate temperatures, the improvement which consists in performing the reaction in the presence of a catalytic amount of sulfuric acid.

7. In the process of epoxidizing a polymerized ethylenically unsaturated higher fatty acid glyceride, by means of formic acid and hydrogen peroxide at moderate temperatures, the improvement which consists in performing the reaction in the presence of a catalytic amount of sulfuric acid.

8. In the process of epoxidizing polymerized soybean oil by means of formic acid and hydrogen peroxide at moderate temperatures, the improvement which consists in performing the reaction in the presence of a catalytic amount of sulfuric acid.

References Cited in the file of this patent

UNITED STATES PATENTS

| | | |
|---|---|---|
| 2,458,484 | Terry | Jan. 4, 1949 |
| 2,485,160 | Niederhauser | Oct. 18, 1949 |
| 2,567,930 | Findley | Sept. 18, 1951 |
| 2,569,502 | Swern | Oct. 2, 1951 |
| 2,801,253 | Greenspan et al. | July 30, 1957 |

OTHER REFERENCES

Findley: J. A. Chem. Soc., Mar. 1945, vol. 67, pp. 412–14.

Swern: J. A. Chem. Soc., vol. 67, Oct. 1946, pp. 1786–9.

Swern: Chemical Reviews, vol. 45, Aug. 1949, pp. 25–28.